(12) United States Patent
Zaccardi et al.

(10) Patent No.: US 10,995,634 B2
(45) Date of Patent: May 4, 2021

(54) COMPOSITE MATERIAL CASING OF STIFFENING SHAPE

(71) Applicant: SAFRAN AIRCRAFT ENGINES, Paris (FR)

(72) Inventors: Cédric Zaccardi, Saint Maur des Fosses (FR); Mathilde Anaëlle Mélissia Saurat, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 255 days.

(21) Appl. No.: 16/123,339

(22) Filed: Sep. 6, 2018

(65) Prior Publication Data
US 2019/0072003 A1   Mar. 7, 2019

(30) Foreign Application Priority Data
Sep. 6, 2017   (FR) ..................... 1758209

(51) Int. Cl.
| F01D 25/24 | (2006.01) |
| B29C 70/24 | (2006.01) |
| B29L 31/00 | (2006.01) |

(52) U.S. Cl.
CPC ............ F01D 25/243 (2013.01); B29C 70/24 (2013.01); F01D 25/24 (2013.01);
(Continued)

(58) Field of Classification Search
CPC ...... F01D 25/24; F01D 25/243; F04D 29/522; F05D 2220/36; F05D 2240/14;
(Continued)

(56) References Cited

U.S. PATENT DOCUMENTS

| 8,322,971 B2 | 12/2012 | Coupe et al. |
| 2012/0099981 A1 | 4/2012 | Verseux et al. |

(Continued)

FOREIGN PATENT DOCUMENTS

| CN | 102400956 A | 4/2012 |
| CN | 104271286 A | 1/2015 |

(Continued)

OTHER PUBLICATIONS

Search Report as issued in French Patent Application No. 1758209, dated Apr. 24, 2018.
(Continued)

*Primary Examiner* — J. Todd Newton
*Assistant Examiner* — Christopher R Legendre
(74) *Attorney, Agent, or Firm* — Pillsbury Winthrop Shaw Pittman LLP

(57) ABSTRACT

A gas turbine casing made of composite material, the casing presenting an axisymmetric shape and including, in an axial direction: an upstream flange; a retention zone presenting thickness greater than the remainder of the casing; and a downstream flange. The casing presents, in section on a plane defined by the axial direction and by a radial direction, a profile including at least first and second inclined portions that are inclined relative to each other and relative to the axis of the casing. The first and second inclined portions meet at a point situated between the retention zone and one of the flanges, this point corresponding to the vertex of an angle formed by the first and second inclined portions. The distance between the vertex of the angle and the mean radius of the casing lies in the range 1.5% and 4% of the mean radius of the casing.

15 Claims, 4 Drawing Sheets

(52) U.S. Cl.
CPC ... *B29L 2031/7504* (2013.01); *F05D 2220/36* (2013.01); *F05D 2240/14* (2013.01); *F05D 2260/96* (2013.01); *F05D 2300/603* (2013.01); *F05D 2300/6033* (2013.01)

(58) Field of Classification Search
CPC ........... F05D 2260/96; F05D 2300/601; F05D 2300/603; F05D 2300/6033
See application file for complete search history.

(56) References Cited

U.S. PATENT DOCUMENTS

| | | |
|---|---|---|
| 2014/0113088 A1 | 4/2014 | Goering |
| 2014/0212273 A1 | 7/2014 | Le Borgne |
| 2019/0072003 A1* | 3/2019 | Zaccardi ............... F01D 25/243 |

FOREIGN PATENT DOCUMENTS

| | | |
|---|---|---|
| CN | 105814282 A | 7/2016 |
| CN | 106794639 A | 5/2017 |
| GB | 967537 A | 8/1964 |
| WO | WO 2006/136755 A2 | 12/2006 |
| WO | WO 2016/027030 A1 | 2/2016 |
| WO | WO 2016/146924 A1 | 9/2016 |
| WO | WO 2017/121949 A1 | 7/2017 |

OTHER PUBLICATIONS

First Office Action as issued in Chinese Patent Application No. 201811036130, dated Dec. 4, 2020.

* cited by examiner

COMPOSITE MATERIAL CASING OF STIFFENING SHAPE

CROSS REFERENCE TO RELATED APPLICATIONS

This application claims priority to French Patent Application No. 1758209, filed Sep. 6, 2017, the entire content of which is incorporated herein by reference in its entirety.

FIELD

The invention relates to gas turbine casings, and more particularly but not exclusively to gas turbine fan casings for aeroengines.

BACKGROUND

In a gas turbine aeroengine, the fan casing performs several functions. In particular, it defines the air inlet passage into the engine, it optionally supports abradable material facing the tips of the fan blades, and/or a soundwave absorber structure for acoustic treatment at the inlet to the engine, and it incorporates or supports a retention shield.

Casings, such as fan casings, used to be made of metal material, but are now made out of composite material, i.e. out of a fiber preform of that is densified with an organic matrix, thereby enabling parts to be made that present overall weight that is lower than the same parts when they are made of metal material, while also presenting mechanical strength that is at least equivalent, if not greater. The fabrication of a fan casing out of organic matrix composite material is described in particular in document U.S. Pat. No. 8,322,971.

Using a casing made of composite material enables the overall weight of the engine to be reduced. Nevertheless, the fan casings of present-day aeroengines are of increasing dimensions, which can lead to problems of rigidity. Specifically, a composite material casing needs to present some minimum level of stiffness in order to avoid responding to vibratory excitation that is harmful for the engine, e.g. in the event of a frequency from the wake of the fan blades crossing an excitation frequency, the casing then entering into resonance when one of its natural frequencies coincides with an exciting harmonic produced by the wake from the blades.

In the prior art, there exist solutions for the purpose of avoiding undesirable vibration modes appearing in a composite material casing. A first solution, as disclosed in particular in Document US 2014/212273 or Document WO 2016/146924, consists in providing the composite material casing with stiffeners that may be added thereto or integral therewith. Nevertheless, that solution leads to a significant increase in the overall weight of the casing, in particular when it is a fan casing of large diameter. Also, that solution is complicated to put into practice since it is necessary to sectorize the stiffeners, and they can become detached following an impact.

Another possible solution is to increase the thickness of the casing locally, however that likewise amounts to significantly increasing the overall weight of the casing.

A third solution, disclosed in Document WO 2016/027030 consists in stiffening a composite material fan casing by providing it with a portion presenting an omega-shaped profile. Nevertheless, that solution results in a large increase in the overall size and in the weight of the casing. Furthermore, because of the complex omega shape of the casing, it is found difficult to make and to install equipment (e.g. acoustic panels, abradable cartridges) on a casing of that type. Finally, the hollow formed by the omega-shaped portion needs to be filled with material, thereby further penalizing the overall weight of the casing.

SUMMARY

An aspect of the invention is to propose a composite material gas turbine casing that presents increased stiffness, and to do so without significantly increasing the weight and/or the size of the casing.

This aspect is achieved by a gas turbine casing made of composite material comprising reinforcement densified by a matrix, the casing presenting an axisymmetric shape, the casing comprising, in an axial direction: an upstream flange; a retention zone presenting thickness greater than the remainder of the casing; and a downstream flange; wherein the casing presents, in section on a plane defined by the axial direction and by a radial direction, a profile including at least first and second inclined portions that are inclined relative to each other and relative to the axis of the casing, the first and second inclined portions meeting at a point situated between the retention zone and one of the flanges, the point corresponding to the vertex of an angle formed by the first and second inclined portions, and wherein the distance between the vertex of the angle and the mean radius of the casing lies in the range 1.5% to 4% of the mean radius of the casing.

The presence in the profile of the casing of at least one "discontinuity" or angle that is offset from a reference plane in alignment with the mean radius of the casing serves to stiffen the composite material casing by reducing the spatial extent of its vibration mode and by raising its natural frequencies relative to a casing presenting a right (i.e. straight) profile. Consequently, the casing of an aspect of the invention presents improved vibration mode behavior, thus making it possible to avoid the appearance of undesirable vibration modes, in comparison with a casing presenting a right profile. Also, the stiffening solution of an aspect of the invention does not lead to an increase in the weight of the casing since making a discontinuity or an angle in the profile of the casing does not require material to be added.

According to a particular aspect of the casing of the invention, the mean radius of the casing lies in the range 1 meter (m) to 2 m, and in an embodiment in the range 1 m to 1.7 m.

According to another particular aspect of the casing of the invention, the first and second inclined portions form an angle directed towards the inside of the casing in the radial direction.

According to another particular aspect of the casing of the invention, the first and second inclined portions form an angle directed towards the outside of the casing in the radial direction.

According to another particular aspect of the casing of the invention, the vertex of the angle formed by the first and second inclined portions lies between the retention zone and the downstream flange.

According to another particular aspect of the casing of the invention, the distance between the vertex of the angle and the mean radius of the casing lies in the range 2% and 3.5% of the mean radius of the casing.

According to another particular aspect of the casing of the invention, the vertex of the angle formed at the junction between the first and second inclined portions is situated at an axial distance from the upstream flange that corresponds to a determined percentage of the total length of the casing in the axial direction. This makes it possible to further improve the rise in frequency and, consequently, to improve the vibration mode behavior of the casing.

Another aspect of the invention also provides a gas turbine engine having a casing of the invention.

In yet another aspect of the invention, there is provided an aircraft including one or more engines of the invention.

An aspect of the invention also provides a method of fabricating a composite material casing for a gas turbine, the method comprising: using three-dimensional or multilayer weaving to weave a fiber texture as a single piece in the form of a strip; shaping the texture by winding it onto support tooling so as to obtain a fiber preform that comprises, in an axial direction, a first portion forming a preform for an upstream flange, a second portion presenting thickness greater than the thickness of the remainder of the preform in order to form a retention zone preform, and a third portion forming a preform for a downstream flange; and densifying the fiber preform with a matrix, wherein during shaping, the fiber texture is shaped in such a manner as to obtain a fiber preform presenting in section on a plane defined by the axial direction and by a radial direction a profile that includes at least first and second inclined portions that are inclined relative to each other and relative to the axial direction, the first and second inclined portions meeting at a point situated between the second portion of the preform forming a retention zone preform and the first portion forming an upstream flange preform or the third portion forming a downstream flange preform, the point corresponding to the vertex of an angle formed by the first and second inclined portions, and wherein the distance between the vertex of the angle and the mean radius of the preform lies in the range 1.5% to 4% of the mean radius of the preform.

According to a particular aspect of the method of the invention, the mean radius of the casing lies in the range 1 m to 2 m, and in an embodiment in the range 1 m to 1.7 m.

According to another particular aspect of the method of the invention, the first and second inclined portions form an angle directed towards the inside of the fiber preform in the radial direction.

According to another particular aspect of the method of the invention, the first and second inclined portions form an angle directed towards the outside of the fiber preform in the radial direction.

According to another particular aspect of the method of the invention, the vertex of the angle formed by the first and second inclined portions lies between the retention zone and the downstream flange.

According to another particular aspect of the method of the invention, the distance between the vertex of the angle and the mean radius of the casing lies in the range 2% and 3.5% of the mean radius of the casing.

According to another particular aspect of the method of the invention, the vertex of the angle formed at the junction between the first and second inclined portions is situated at an axial distance from the first preform portion forming an upstream flange portion that corresponds to a determined percentage of the total length of the preform in the axial direction.

BRIEF DESCRIPTION OF THE DRAWINGS

Other characteristics and benefits of the invention appear from the following description of particular embodiments of the invention, given as nonlimiting examples, and with reference to the accompanying drawings, in which.

DETAILED DESCRIPTION

The invention applies in general manner to any gas turbine casing made of composite material.

The invention is described below in the context of its application to a fan casing for a gas turbine aeroengine.

Figure 1:
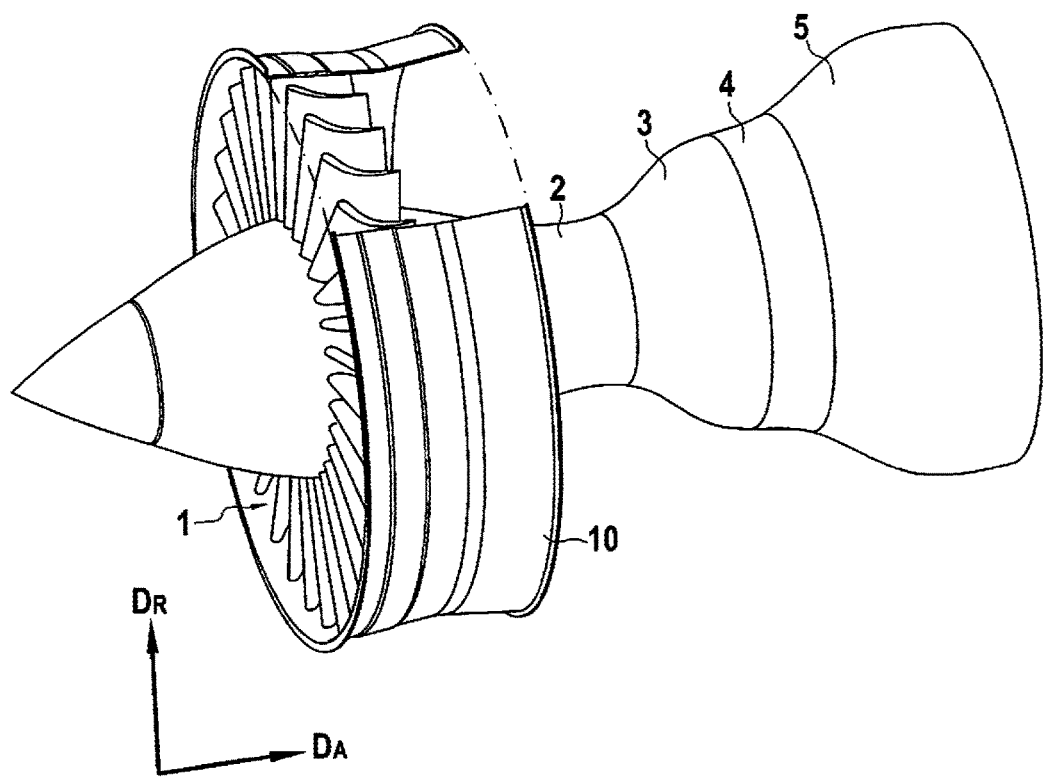
FIG. 1 is a perspective view of an aeroengine in accordance with an embodiment of the invention.

As shown diagrammatically in FIG. 1, such an engine comprises from upstream to downstream in the flow direction of the gas stream: a fan 1 arranged at the inlet of the engine; a compressor 2; a combustion chamber 3; a high-pressure turbine 4; and a low-pressure turbine 5.

The engine is housed inside a casing comprising a plurality of portions that correspond to different elements of the engine. Thus, the fan 1 is surrounded by a fan casing 10 that is axisymmetric.

Figure 2:
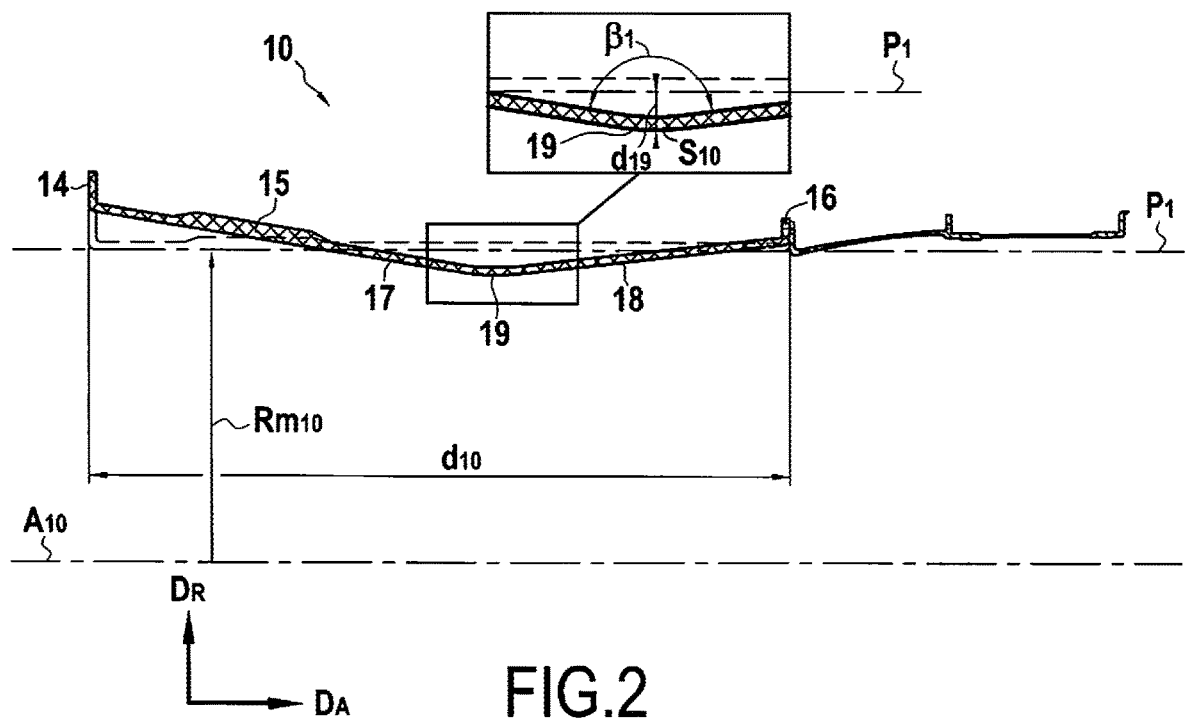
FIG. 2 is a half view in axial section of the fan casing of the FIG. 1 engine.

FIG. 2 shows the profile of the fan casing 10, the profile corresponding to a section on a plane defined by a radial direction $D_A$ parallel to the axis $A_{10}$ of the casing 10 and by a radial direction $D_R$. In this example, the casing 10 is made of organic matrix composite material, i.e. from reinforcement made out of fibers, e.g. carbon, glass, aramid, or ceramic fibers, and densified by a polymer matrix, e.g. made out of epoxy, bismaleimide, or polyimide resin. The fabrication of such a casing is described in particular in Document U.S. Pat. No. 8,322,971.

In the axial direction $D_A$, the casing 10 has an upstream flange 14 extending in the radial direction $D_R$, a retention zone 15 presenting extra thickness compared with the remainder of the casing, and a downstream flange 16 extending in the radial direction $D_R$. The flanges 14 and 16 present at the upstream and downstream ends of the casing 10 enable it to be mounted on and connected to other elements. The retention zone 15 corresponds to a portion of extra thickness of the casing that extends over a determined length in the axial direction $D_A$ in order to form a retention zone that is capable of retaining debris, particles, or objects that have been ingested into the inlet of the engine, or that come from damage to the blades of the fan, and that have been thrown radially outwards by the rotation of the fan, in order to prevent them from passing through the casing and damaging other portions of the aircraft.

In accordance with an embodiment of the invention, the casing 10 includes first and second portions 17 and 18 that are inclined both relative to each other and also relative to the axis $A_{10}$ of the casing. The first and second inclined portions 17 and 18 meet at a point $S_{10}$ situated between the retention zone 15 and one of the upstream and downstream flanges, specifically the downstream flange 16 in this example. The point $S_{10}$ corresponds to the vertex 19 of an angle $\beta_1$ formed by the first and second inclined portions. In the presently described example, the first and second inclined portions 17 and 18 form an obtuse angle $\beta_1$ having its vertex 19 directed towards the inside of the casing 10.

Still in accordance with an embodiment of the invention, the vertex 19 of the angle $\beta_1$ is situated in the radial direction $D_R$ at a determined distance $d_{19}$ from a rectilinear plane $P_1$ that is in alignment with the mean radius $Rm_{10}$ of the casing 10. The term "mean radius of the casing" is used herein to mean the average between the diameter of the inside profile and the diameter of the outside profile of the casing, not including the flanges.

Figure 3:
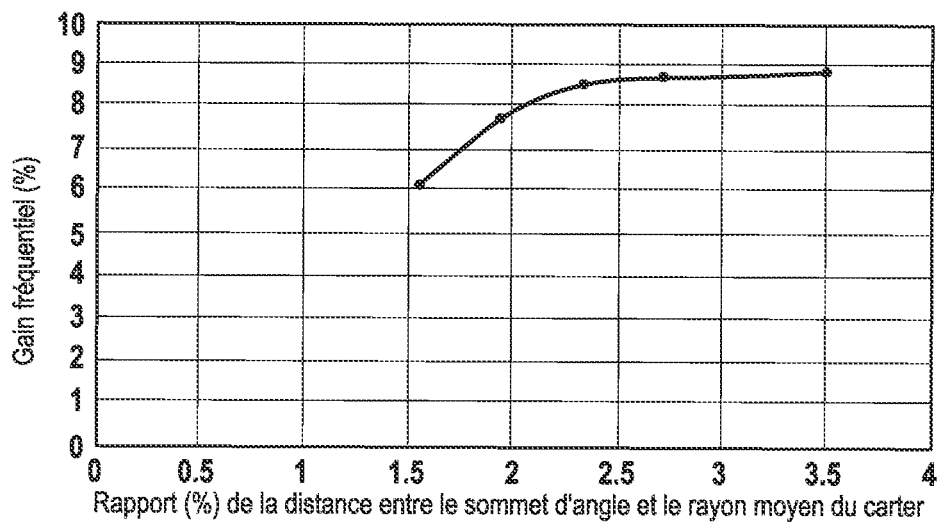
FIG. 3 is a graph showing the rise in frequency obtained with a casing of the invention as a function of the distance between the vertex of the angle and the mean radius of the casing.

The inventors have determined that the distance $d_{19}$ in the radial direction $D_R$ between the vertex 19 of the angle $\beta_1$ and the mean radius of the casing (plane $P_1$) lies in the range 1.5% to 4% of the mean radius of the casing, and in an embodiment in the range 2% to 3.5% of the mean radius of the casing. By way of nonlimiting example, FIG. 3 shows the resulting rise in frequency as a function of the distance between the vertex of the angle formed by the first and second inclined portions, such as the portions 17 and 18 of the casing 10 in FIG. 2, and the mean radius of the casing such as the mean radius $Rm_{10}$ of the casing 10 of FIG. 2, the rise in frequency being determined relative to a right casing, i.e. a casing that does not present a discontinuity or angle vertex. In a particular embodiment, the mean radius $Rm_{10}$ lies in the range 1 m to 2 m, for example in the range 1 m to 1.7 m. By way of example, for a casing presenting a mean radius of 1.17 m, it is observed that a rise in frequency of 9% is achieved from a distance of 35 mm between the angle vertex and the mean radius, i.e. about 3% of the mean radius of the casing, with the rise in frequency stagnating substantially at this value for greater distances between that the angle vertex and the mean radius of the casing. In this example, rise in frequency corresponds to the ratio (expressed as a percentage) of the difference between the frequency obtained with a casing presenting a discontinuity or angle vertex and the frequency obtained with the same casing but without a discontinuity or angle vertex, divided by the frequency obtained with the same casing but without a discontinuity or angle vertex.

FIG. 3 shows by way of example, measured percentage values lying in the range 1.5% to 3.5%, however the measurement range could be extended by extrapolating the curve. Below and in the proximity of 1.5%, the curve would be substantially linear, extending at a slope similar to that observed in the range 1.5% to 2%. In the range 3% to 4%, the slope of the curve should likewise be considered as being substantially constant.

The casing of an embodiment of the invention may include one or more pairs of inclined portions, each defining a discontinuity or angle vertex situated between the retention zone and one of the flanges.

Figure 4:
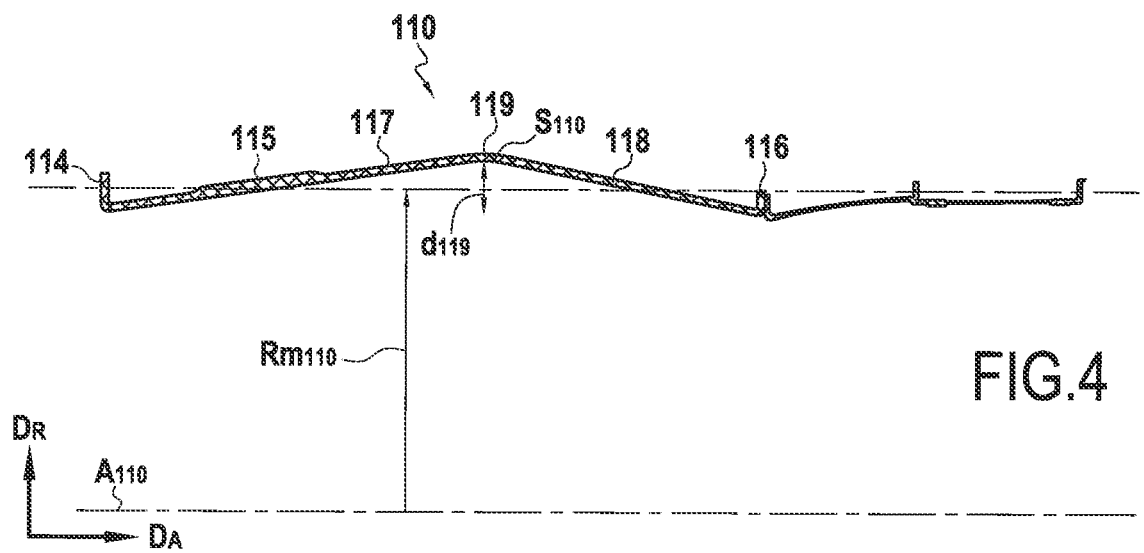
FIG. 4 is a half view in axial section of a fan casing in accordance with another embodiment of the invention.

The angle vertex(ices) may be directed towards the inside of the casing in the radial direction, as with the angle vertex 19 of the casing 10 in FIG. 2. The angle vertex(ices) may be directed towards the outside of the casing in the radial direction, as with the casing 110 in FIG. 4, which includes first and second inclined portions 117 and 118 present between firstly a retention zone 115 downstream from an upstream flange 114 and secondly a downstream flange 116, the inclined portions 117 and 118 meeting at a point $S_{110}$ forming a vertex angle 119 directed towards the outside of the casing 110. The distance $d_{119}$ in the radial direction between the angle vertex 119 and the mean radius $Rm_{110}$ of the casing 110 defined from the axis $A_{110}$ of the casing lies in the range 1.5% and 4% of the mean radius of the casing 110, and in an embodiment in the range 2% to 3.5% of the mean radius of the casing. In FIG. 4, the mean radius $Rm_{110}$ of the casing 110 corresponds approximately to the radius of a right cylinder coinciding with the inside of the downstream flange 116 of the casing 110.

Figure 5:
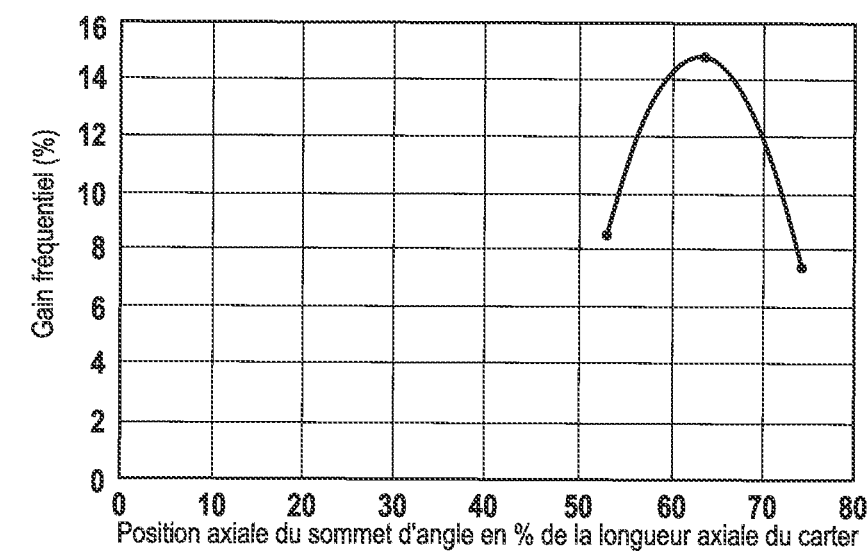
FIG. 5 is a graph showing the rise in frequency obtained with a casing of the invention as a function of the axial position of the vertex of the angle along the casing.

Furthermore, the angle vertex(ices) may be present at different axial positions between the retention zone and a flange of the casing. Nevertheless, the inventors have determined that the rise in frequency can be further improved as a function of the axial position of the angle vertex formed at the junction between the first and second inclined portions. By way of nonlimiting example, FIG. 5 shows the rise in frequency obtained as a function of the axial position of the angle vertex formed by the first and second inclined portions such as the portions 17 and 18 of the casing 10 in FIG. 2 relative to the size of the casing in the axial direction, i.e. the distance between the upstream and downstream flanges of the casing such as the distance $d_{10}$ between the upstream flange 14 and the downstream flange 16 of the casing 10 in FIG. 2, the rise in frequency being determined relative to a right casing, i.e. a casing that does not present a discontinuity or an angle vertex. In this example, the angle vertex is situated at 3% of the mean radius of the casing. For a casing presenting a total axial distance between its upstream and downstream flanges of 90 centimeters (cm), it is observed that a rise in frequency of 15% is achieved when the angle vertex is situated at about 600 millimeters (mm) from the upstream flange in the axial direction $D_A$ (distance $d_{419}$), i.e. about 65% of the total length of the casing in the axial direction $D_A$, starting from the upstream flange. The value of 65% corresponds to a value determined as a function of the above-described casing dimensions. Naturally, other values may be considered for other casing dimensions, e.g. concerning the diameter and/or the axial length of the casing.

FIG. 5 shows values for axial positions of the angle vertex beside the downstream flange, however the angle vertex could be located beside the upstream flange for different casing configurations in which the retention zone is closer to the downstream flange than to the upstream flange.

There follows a description of a method of fabricating the casing 10 shown in FIG. 2 out of composite material comprising fiber reinforcement densified by a matrix.

Figure 6:
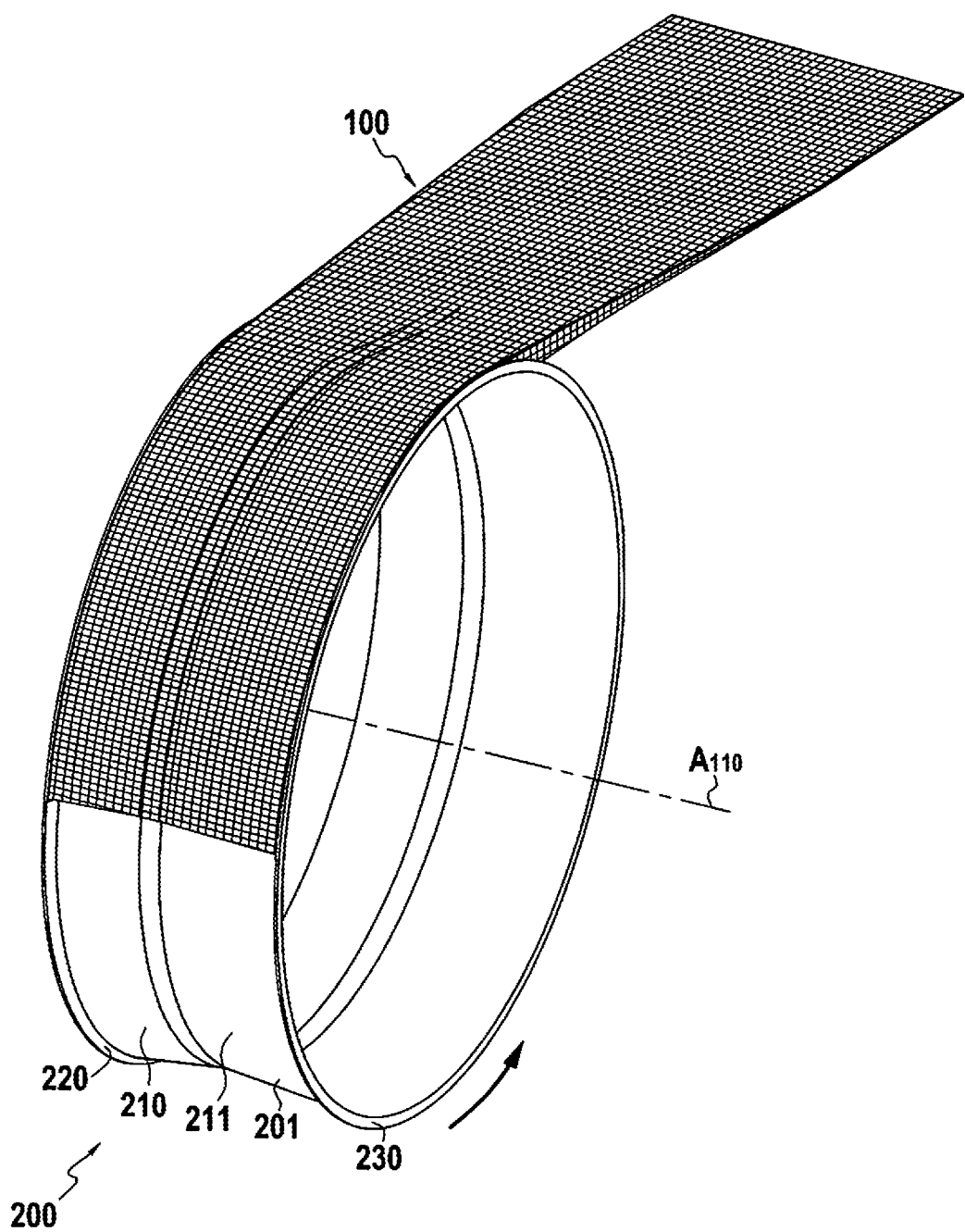
FIG. 6 is a perspective view showing a fiber texture being shaped to form the reinforcement of the FIG. 2 fan casing.

Making the casing begins by forming a fiber texture in the form of a strip. FIG. 6 shows in very diagrammatic manner a fiber structure 100 woven in the form of a strip that is to form a fiber preform for an aeroengine casing.

The fiber texture 100 is obtained by three-dimensional weaving or by multilayer weaving performed in known manner by means of a Jacquard type loom having a bundle of warp yarns or strands arranged thereon in a plurality of layers, the warp yarns being interlinked by weft yarns.

In the example shown, the three-dimensional weaving is weaving with an "interlock weave". The term "interlock weave" is used herein to mean a weave in which each weft layer interlinks a plurality of warp layers with all of the yarns in a given weft column having the same movement in the weave plane.

Other types of multilayer weaving could be used, in particular such as those described in Document WO 2006/136755, the content of which is incorporated herein by way of reference.

In particular, the fiber structure may be woven using yarns made of fibers of carbon, of ceramic such as silicon carbide, of glass, or indeed of aramid.

As shown in FIG. 6, the fiber reinforcement is formed by winding the fiber texture 100 onto a mandrel 200, which fiber texture 100 is made by three-dimensional weaving to have varying thickness, and which mandrel 200 has a profile that corresponds to the profile of the casing that is to be made. Beneficially, the fiber reinforcement constitutes a complete tubular fiber preform for the casing 10 forming a single piece with first and second inclined portions corresponding to the inclined portions 17 and 18 of the casing 10 and defining a discontinuity or the angle vertex 19.

For this purpose, the mandrel 200 presents an outside surface 201 of profile that corresponds to the inside surface of the casing that is to be made. By being wound onto the mandrel 200, the fiber texture 100 fits closely to the profile of the mandrel. On its outer surface 201, the mandrel 200 includes first and second slopes 210 and 211 of shape and dimensions that correspond to the shape and dimensions of the first and second inclined portions 17 and 18 of the casing 10 that is to be made. The mandrel 200 also has two cheek-plates 220 and 230 for forming the portions of the fiber preform that corresponded to the flanges 14 and 15 of the casing 10.

Figure 7:
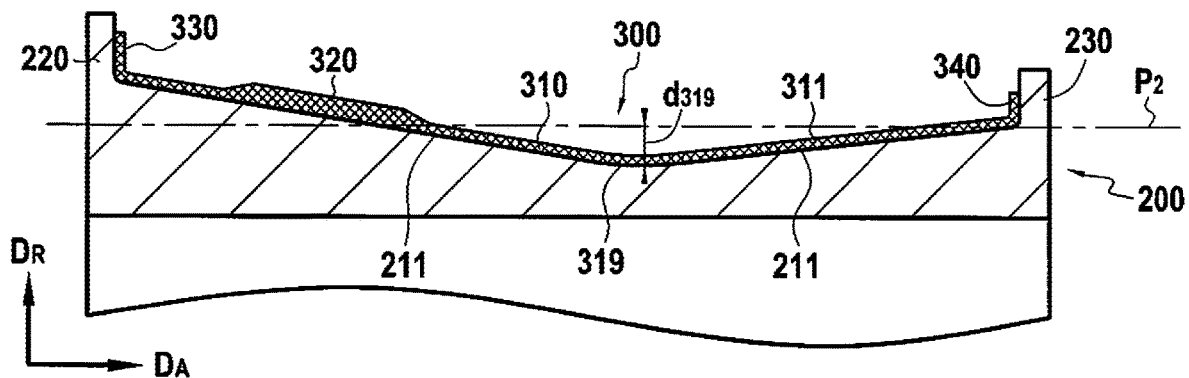
FIG. 7 is a half view in axial section of a preform of the FIG. 2 casing obtained by winding the fiber texture, as shown in FIG. 6.

FIG. 7 is a section view of the fiber preform 300 obtained after winding the fiber texture 100 as a plurality of layers onto the mandrel 200. The number of layers or turns is a function of the desired thickness and of the thickness of the fiber texture. It is desirably not less than two. In the presently described example, the preform 300 comprises four layers of fiber texture 100.

A fiber preform 300 is obtained with first and second inclined portions 310 and 311 situated between a portion 320 of greater thickness that is to form the retention zone 15 of the casing and an end portion 340 that is to form the downstream flange 16 of the casing 10, there being another end portion 330 that is opposite from the portion 340 in order to form the upstream flange 14 of the casing 10. The first and second inclined portions 310 and 311 meet to form an angle vertex 319 corresponding to the angle vertex 19 present on the casing 10. The distance $d_{319}$ between the angle vertex 319 and the mean radius of the preform 300 represented in FIG. 7 by a plane $P_2$ lies in the range 1.5% to 4% of the mean radius of the preform (for example in the range 2% to 3.5% of the mean radius of the preform).

The fiber preform 300 is then densified with a matrix.

Densifying the fiber preform consists in using the material that constitutes the matrix to fill the pores of the preform throughout all or part of its volume.

The matrix may be obtained in conventional manner by a method involving a liquid technique.

Figure 8:
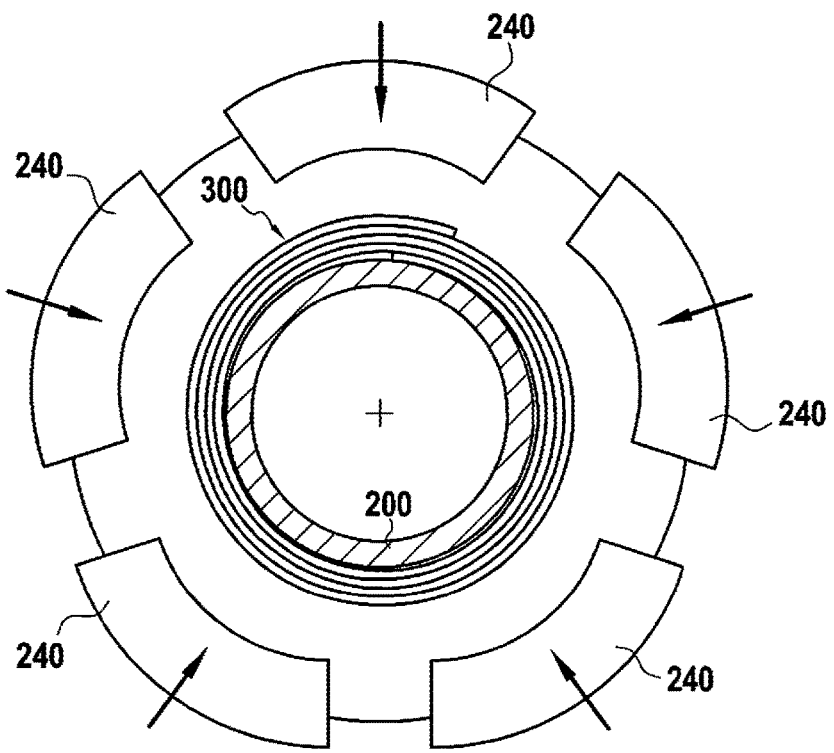
FIG. 8 is a section view showing the positioning of injection sectors on the FIG. 2 casing preform obtained by winding the fiber texture as shown in FIG. 6.

The liquid technique consists in impregnating the preform with a liquid composition containing an organic precursor of the material of the matrix. The organic precursor is usually in the form of a polymer, such as a resin, optionally diluted in a solvent. The fiber preform is placed in a mold that can be closed in leaktight manner and that includes a recess having the shape of the final molded part. As shown in FIG. 8, in this example, the fiber preform 300 is placed between a plurality of sectors 240 forming a mold cover and the mandrel 200 forming a support, these elements respectively presenting the outside shape and the inside shape of the casing that is to be made. Thereafter, the liquid matrix precursor, e.g. a resin, is injected throughout the cavity in order to impregnate the entire fiber portion of the preform.

The precursor is transformed into an organic matrix, i.e. it is polymerized, by applying heat treatment, generally by heating the mold, after eliminating any solvent and after curing the polymer, the preform being maintained continuously inside the mold of shape that corresponds to the shape of the part that is to be made. In particular, the organic matrix may be obtained from epoxy resins, e.g. such as high-performance epoxy resin, or from liquid precursors of carbon or ceramic matrices.

When forming a carbon or ceramic matrix, the heat treatment consists in pyrolysing the organic precursor in order to transform the organic matrix into a carbon or ceramic matrix depending on the precursor used and on pyrolysis conditions. By way of example, liquid precursors of carbon may be resins having a relatively high coke content, such as phenolic resins, whereas liquid precursors of ceramic, in particular of SiC, may be resins of the polycarbosilane (PCS) or polytitanocarbosilane (PTCS) or polysilazane (PSZ) type. It is possible to perform a plurality of consecutive cycles from impregnation to heat treatment in order to achieve the desired degree of densification.

In an aspect of the invention, the fiber preform may be densified by the well-known resin transfer molding (RTM) method. In the RTM method, the fiber preform is placed in a mold that presents the shape of the casing that is to be made. A thermosetting resin is injected into the inside space defined in the mold and that contains the fiber preform. A pressure gradient is generally established across this inside space between the location where the resin is injected and resin discharge orifices in order to control and to optimize impregnation of the preform with the resin.

By way of example, the resin used may be an epoxy resin. Resins suitable for RTM methods are well-known. It is desirable that they present low viscosity in order to facilitate injecting them between the fibers. The temperature class and/or the chemical nature of the resin is/are selected as a function of the thermomechanical stresses to which the part is to be subjected. Once the resin has been injected throughout the reinforcement, it is polymerized by heat treatment in compliance with the RTM method.

After injection and polymerization, the part is unmolded. For this purpose, the mandrel 200 can be separated into two portions at the junction between the first and second slopes 210 and 211 in order to enable the part to be unmolded. To finish off, the part is trimmed in order to remove excess resin and chamfers are machined in order to obtain the casing 10 shown in FIGS. 1 and 2.

The description above takes into consideration only one pair of first and second inclined portions between the retention zone and the downstream flange. With a casing of appropriate dimensions, in particular in the axial direction, it is possible to take into consideration two consecutive pairs of first and second inclined portions, e.g. having similar angles in the pairs of inclined portions and similar values for the distance between the vertex of the angle and the mean radius of the casing. By way of example, these inclined portions may be arranged in a W configuration, possibly with a cylindrical segment between the two pairs.

The invention claimed is:

1. A gas turbine casing made of composite material comprising reinforcement densified by a matrix, said casing presenting an axisymmetric shape around an axis defining an axial direction of the casing, the casing comprising: an upstream flange; a retention zone presenting a maximum thickness of the casing; and a downstream flange; wherein the casing presents, in section on a plane defined by the axial direction and by a radial direction, a profile including at least first and second inclined portions that are inclined relative to each other and relative to the axis of the casing, the first and second inclined portions meeting at a point situated between the retention zone and one of the upstream and downstream flanges, said point corresponding to a vertex of an angle formed by the first and second inclined portions, and wherein a distance between the vertex of the angle and a mean radius of the casing relative to the axis lies in the range 1.5% to 4% of said mean radius of the casing.

2. The casing according to claim 1, wherein the mean radius of the casing lies in the range 1 m to 2 m.

3. The casing according to claim 1, wherein the mean radius of the casing is 1.7 m.

4. The casing according to claim 1, wherein the angle formed by the first and second inclined portions is directed towards an inside of the casing in the radial direction.

5. The casing according to claim 1, wherein the angle formed by the first and second inclined portions is directed towards an outside of the casing in the radial direction.

6. The casing according to claim 1, wherein the vertex of the angle formed by the first and second inclined portions lies between the retention zone and the downstream flange.

7. The casing according to claim 1, wherein the distance between the vertex of the angle and the mean radius of the casing lies in the range 2% and 3.5% of said mean radius of the casing.

8. A gas turbine engine having the casing according to claim 1.

9. An aircraft having one or more of the gas turbine engine according to claim 8.

10. A method of fabricating a composite material casing for a gas turbine engine, said casing presenting an axisymmetric shape around an axis defining an axial direction of the casing, the method comprising: using three-dimensional or multilayer weaving to weave a fiber texture as a single piece in the form of a strip; shaping said fiber texture by winding it onto support tooling so as to obtain a fiber preform that comprises, in the axial direction, a first portion forming a preform for an upstream flange, a second portion presenting a maximum thickness of the fiber preform in order to form a retention zone preform, and a third portion forming a preform for a downstream flange; and densifying the fiber preform with a matrix, wherein the fiber preform presents in section on a plane defined by the axial direction and by a radial direction a profile that includes at least first and second inclined portions that are inclined relative to each other and relative to the axial direction, the first and second inclined portions meeting at a point situated between the second portion of the fiber preform forming the retention zone preform and the first portion forming the upstream flange preform or the third portion forming the downstream flange preform, said point corresponding to a vertex of an angle formed by the first and second inclined portions, and wherein a distance between the vertex of the angle and a mean radius of the fiber preform relative to the axis lies in the range 1.5% to 4% of the mean radius of the fiber preform.

11. The method according to claim 10, wherein the mean radius of the casing lies in the range 1 m to 2 m.

12. The method according to claim 10, wherein the angle formed by the first and second inclined portions is directed towards an inside of the fiber preform in the radial direction.

13. The method according to claim 10, wherein the angle formed by the first and second inclined portions is directed towards an outside of the fiber preform in the radial direction.

14. The method according to claim 10, wherein the vertex of the angle formed by the first and second inclined portions lies between the retention zone preform and the downstream flange.

15. The method according to claim 10, wherein the distance between the vertex of the angle and the mean radius of the casing lies in the range 2% and 3.5% of said mean radius of the fiber preform.

* * * * *